(12) United States Patent
Ridl

(10) Patent No.: US 7,359,145 B2
(45) Date of Patent: Apr. 15, 2008

(54) NON-TAPE DATA STORAGE CARTRIDGE WITH HANDLING FEATURE AND ASSOCIATED CARTRIDGE DRIVE

(75) Inventor: Peter A. Ridl, Oakdale, MN (US)

(73) Assignee: Imation Corp., Oakdale, MN (US)

( * ) Notice: Subject to any disclaimer, the term of this patent is extended or adjusted under 35 U.S.C. 154(b) by 365 days.

(21) Appl. No.: 10/881,666

(22) Filed: Jun. 30, 2004

(65) Prior Publication Data

US 2006/0002009 A1 Jan. 5, 2006

(51) Int. Cl.
G11B 23/03 (2006.01)
G11B 17/08 (2006.01)

(52) U.S. Cl. .................. 360/98.06; 360/133
(58) Field of Classification Search ........... 360/96.5, 360/98.04, 98.06, 99.02, 99.03, 99.06, 99.07, 360/92, 96.6, 133; 369/30.06, 30.65; 720/656, 720/630
See application file for complete search history.

(56) References Cited

U.S. PATENT DOCUMENTS

| | | | | |
|---|---|---|---|---|
| 3,999,219 | A * | 12/1976 | Andrews | 360/92 |
| 5,062,093 | A * | 10/1991 | Christie et al. | 369/30.48 |
| 5,610,788 | A | 3/1997 | Standiford et al. | 360/132 |
| 5,640,288 | A * | 6/1997 | Horie | 360/98.04 |
| 5,886,859 | A | 3/1999 | Oishi | 360/133 |
| 5,949,611 | A | 9/1999 | Stephens et al. | 360/96.5 |
| 5,995,477 | A | 11/1999 | Smith et al. | 369/30.42 |
| 6,069,777 | A | 5/2000 | Vanderheyden et al. | 360/132 |
| 6,072,657 | A * | 6/2000 | Konno | 360/92 |
| 6,244,677 | B1 | 6/2001 | Millhiser et al. | 312/9.48 |
| 6,396,658 | B1 * | 5/2002 | Iwabuchi | 360/92 |
| 6,540,528 | B2 | 4/2003 | Brodsky et al. | 439/67 |
| 6,545,865 | B2 | 4/2003 | Albrecht et al. | 361/685 |
| 6,636,942 | B2 | 10/2003 | Greco | 711/112 |
| 6,650,601 | B1 | 11/2003 | Emberty et al. | 369/30.46 |
| 6,690,539 | B2 | 2/2004 | Gallo et al. | 360/97.01 |
| 6,693,859 | B1 | 2/2004 | Kulakowski et al. | 369/30.43 |
| 6,722,895 | B1 | 4/2004 | Brodsky et al. | 439/67 |
| 6,731,455 | B2 | 5/2004 | Kulakowski et al. | 360/92 |
| 6,771,448 | B2 | 8/2004 | Blair et al. | 360/69 |
| 6,810,005 | B2 * | 10/2004 | Shiomi et al. | 720/738 |
| 6,819,524 | B2 | 11/2004 | Kulakowski et al. | 360/92 |
| 6,826,004 | B2 | 11/2004 | Albrecht et al. | 360/69 |
| 6,837,718 | B2 | 1/2005 | Brodsky et al. | 439/67 |
| 6,854,982 | B2 | 2/2005 | Brodsky et al. | 439/67 |
| 6,867,942 | B2 | 3/2005 | Albrecht et al. | 360/69 |
| 2002/0159182 | A1 | 10/2002 | Albrecht et al. | 360/69 |

FOREIGN PATENT DOCUMENTS

| | | |
|---|---|---|
| EP | 0 392 620 | 10/1990 |
| EP | 0439286 A2 * | 7/1991 |
| WO | WO 03/060913 | 7/2003 |

OTHER PUBLICATIONS

"Data Interchange on 12,7 mm 384-Track Magnetic Tape Cartridges—Ultrium-1 Format," Section 2 of Standard ECMA-319, ECMA Standarizing Information and Communication Systems, Jun. 2001, pp. 8-36.

* cited by examiner

Primary Examiner—Julie Anne Watko
(74) Attorney, Agent, or Firm—Eric D. Levinson

(57) ABSTRACT

A data storage cartridge including a non-tape storage medium, and a housing maintaining the non-tape storage medium. The housing defines a plurality of external handling features for interaction with at least one of a cartridge storage unit and a cartridge drive to facilitate positioning and selective maintenance of the data storage cartridges within the at least one of the cartridge storage unit and the cartridge drive.

15 Claims, 6 Drawing Sheets

NON-TAPE DATA STORAGE CARTRIDGE WITH HANDLING FEATURE AND ASSOCIATED CARTRIDGE DRIVE

THE FIELD OF THE INVENTION

The present invention generally relates to a data storage cartridge. More particularly, the present invention relates to a data storage cartridge for housing a non-tape data storage medium and defining at least one handling feature for aligning the non-tape data storage cartridge within a cartridge drive and/or a cartridge storage unit.

BACKGROUND OF THE INVENTION

Data storage tape cartridges have been used for decades in the computer, audio, and video fields as a means for storing electronic files. The data storage tape cartridges continue to be a popular form of recording large volumes of information for subsequent retrieval and use, particularly in a library setting. Automated data storage tape cartridge libraries provide access to vast amounts of electronic data by storing and managing a plurality of data storage tape cartridges.

In a conventional, automated, data storage tape cartridge library system, an automation unit, such as a robotic arm or other mechanism, typically services a plurality of data storage tape cartridge storage cells. The automation unit selectively retrieves a data storage tape cartridge from one of the storage cells and loads the retrieved data storage tape cartridge into a designated tape drive. The tape drive reads data from or writes new data to the data storage tape cartridge. When the tape drive is finished with the data storage tape cartridge, the automation unit retrieves the data storage tape cartridge from the tape drive and returns the data storage tape cartridge to the assigned storage cell. A host computing system communicates with the library controlling unit to typically control the operation of the automated cartridge library. In this way, a large number of data storage tape cartridges are automatically accessible by one or more tape drives.

To manipulate a data storage tape cartridge, the automation unit typically includes an interface, such as a gripper on a robotic arm, that engages the data storage tape cartridge and allows the automation unit to convey and manipulate the orientation of the data storage tape cartridge. Because the data storage tape cartridges must be positioned in a precise manner for the robotic arm to grasp and position them correctly, the data storage tape cartridges and the storage cells are constructed with generally exact dimensions. Accordingly, the data storage tape cartridges that the library system houses typically have substantially similar, if not identical, form factors in order to be properly received by the interface of the automation unit.

Although conventional, automated libraries provide access to vast amounts of information, the data storage tape cartridges do not allow for true random access of files stored on the data storage tape cartridges. In particular, a conventional data storage data tape cartridge consists of a tape, i.e., an elongated flexible medium having a magnetic recording layer, wound on one or more wheels or hubs. Data is recorded and retrieved by inserting the data storage tape cartridge within a tape drive and passing the recording medium in front of one or more read/write heads. The tape drives are usually streaming devices in which data is recorded in a serpentine fashion as the tape streams back and forth. In particular, the tape drive typically writes the data along a number of pin reception tracks that span the length of the medium. For this reason, data storage tape cartridges can be viewed as sequentially storing the data in a linear format.

The linear data storage format prevents true random access to individual files. In particular, a tape drive must scan through the entire length of the tape until the appropriate file mark is identified, thereby increasing the file retrieval time. As such, a need exists for a data storage cartridge configured to house and protect a non-tape storage medium and yet be compatible with conventional, automated, data storage tape cartridge library systems.

SUMMARY OF THE INVENTION

One aspect of the present invention relates to a data storage cartridge including a non-tape storage medium, and a housing maintaining the non-tape storage medium. The housing defines a plurality of external handling features for interaction with at least one of a cartridge storage unit and a cartridge drive to facilitate positioning and selective maintenance of the data storage cartridges within the at least one of the cartridge storage unit and the cartridge drive.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DETAILED DESCRIPTION OF THE PREFERRED EMBODIMENTS

Figure 1:
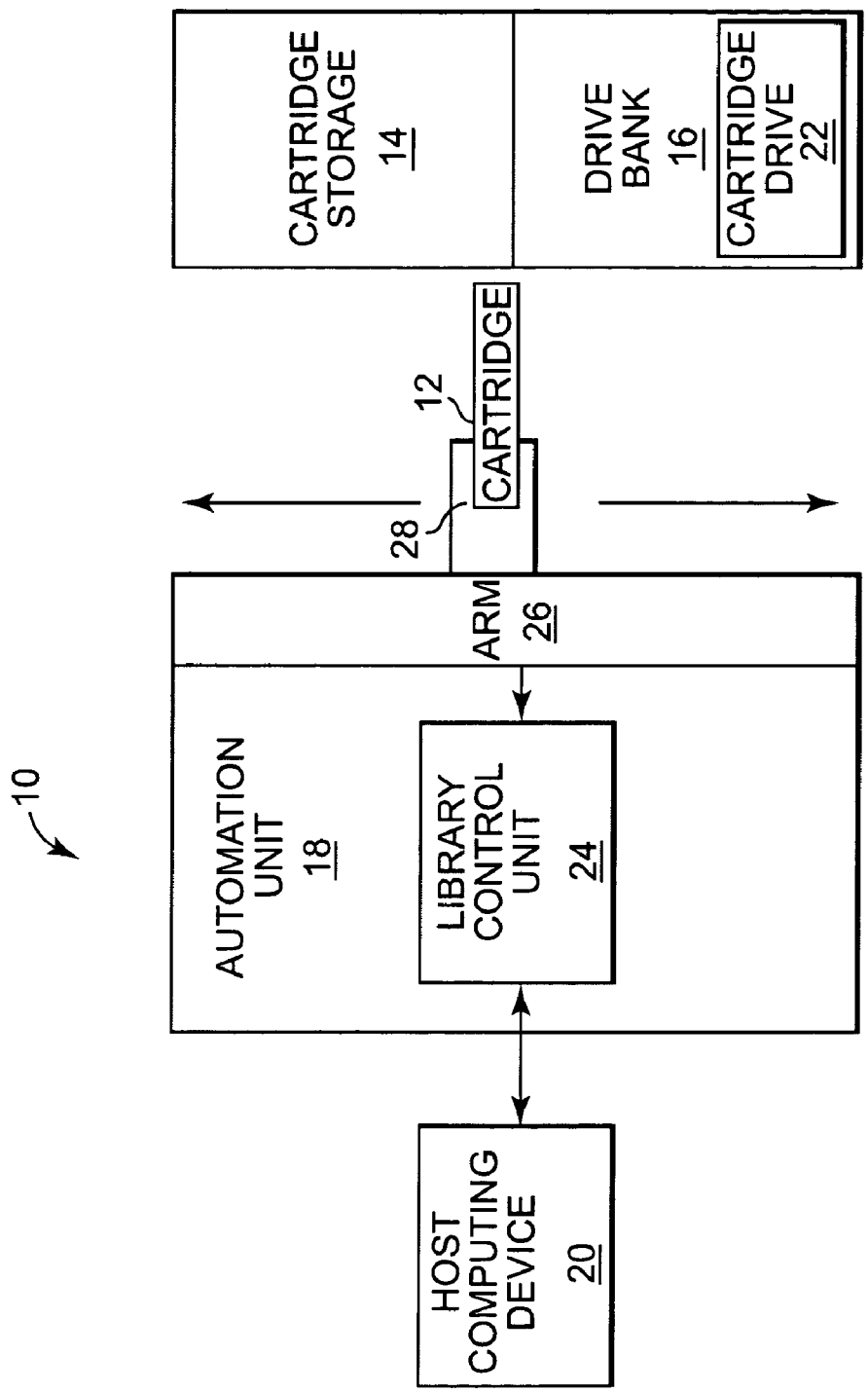
FIG. 1 is a block diagram of one embodiment of an automated library system according to the present invention.

An exemplary embodiment of an automated library system 10 containing and utilizing at least one data storage cartridge 12 housing a non-tape storage medium according to the present invention is generally illustrated in FIG. 1. Automated library system 10 includes a cartridge storage unit 14, a drive bank 16, an automation unit 18, and a host computing device 20. Generally, the host computing device 20 signals the automation unit 18 to retrieve a particular data storage cartridge 12 from the cartridge storage unit 14. The automation unit 18 removes the particular data storage cartridge 12 from the cartridge storage unit 14 and inserts the particular data storage cartridge 12 into a cartridge drive 22 in the drive bank 16. When in the cartridge drive 22, the host computing device 20 accesses the particular data storage cartridge 12 to read from or write to the data storage cartridge 12. Upon reading from and/or writing to the data storage cartridge 12, the host computing device 20 signals the automation unit 18, and the automation unit 18 returns the particular data storage cartridge 12 to the cartridge storage unit 14.

Figure 4:
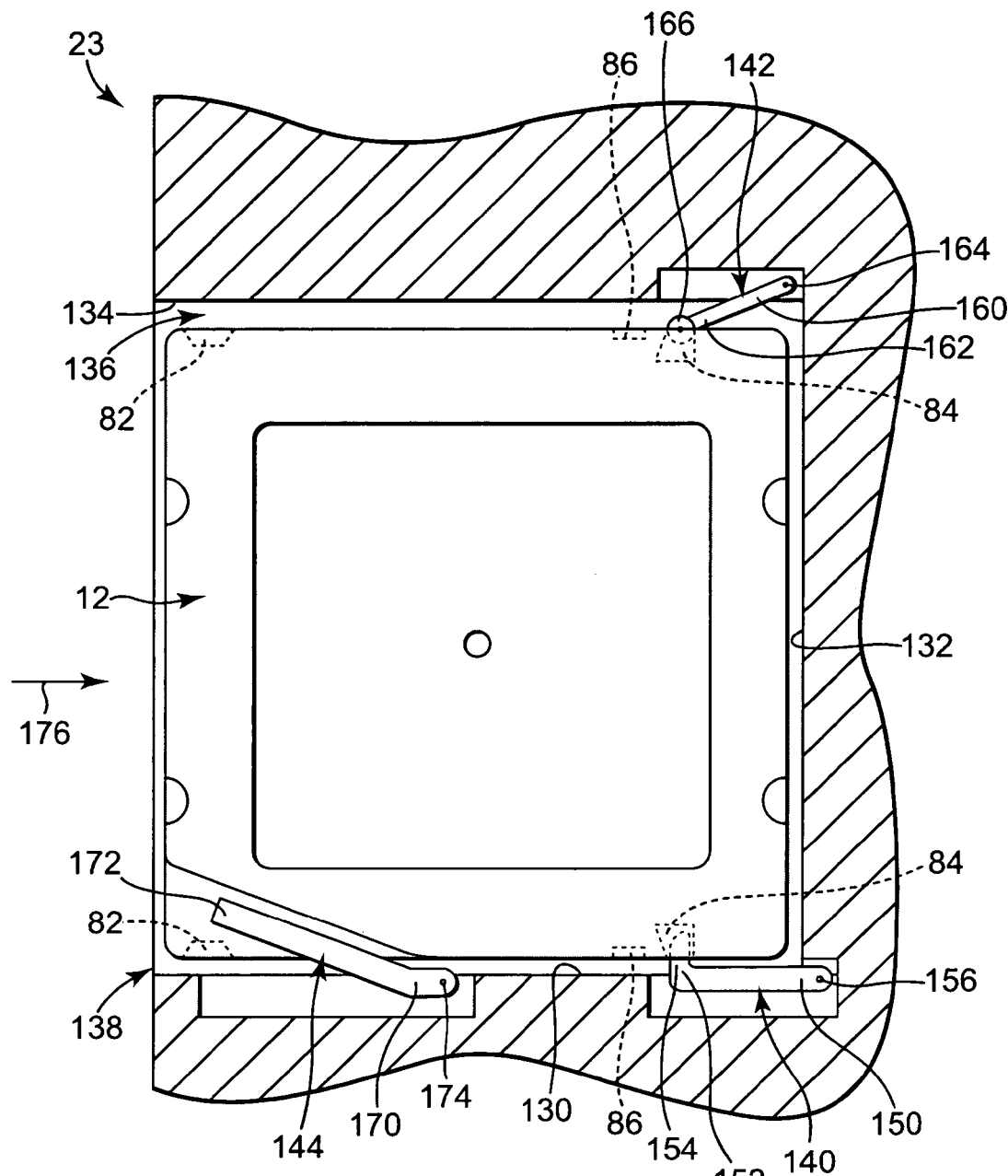
FIG. 4 is a top view of the data storage cartridge of FIG. 2 and a portion of a cartridge storage unit of the automated library system of FIG. 1.

The cartridge storage unit 14 provides a plurality of storage cartridge locations or storage cells 23 (FIG. 4). Each of the storage cells 23 provides storage for a single non-tape data storage cartridge 12 or a conventional data storage tape cartridge, and each data storage cartridge 12 or data storage tape cartridge has an assigned storage cell 23 within the cartridge storage unit 14. In addition, each of the data storage cartridges 12 stored in the cartridge storage unit 14 can include identifying information, such as a label, a barcode, or a radio frequency (RF) tag, by which the automation unit 18 identifies the individual data storage cartridges 12. Due to the use of the automation unit 18 in the automated library system 10, the cartridge storage unit 14 is created with precise dimensions, as required by the automation unit 18, to allow the automation unit 18 to easily access a particular storage cell 23 within the cartridge storage unit 14. In one embodiment, the cartridge storage unit 14 includes a plurality of conventional, data storage tape cartridges, such as the data storage tape cartridge, as well as a plurality of data storage cartridges 12.

The drive bank 16 includes at least one, and preferably a plurality, of drive locations (not shown). Each of the drive locations is adapted to receive a conventional tape drive or a non-tape cartridge drive 22. In one embodiment, the cartridge drive 22 is configured to read and/or write to the data storage cartridge 12. In one embodiment, the cartridge drive 22 is a tape drive emulator configured to read from the data storage cartridge 12 and to present the data in a format similar to that received from a conventional data storage tape cartridge.

The drive bank 16 is also construed with precise measurements, as required by the automation unit 18, to allow the automation unit 18 to easily access a particular tape drive or a particular cartridge drive 22 within a particular drive location. Each of the tape drives or cartridge drives 22 is connected to the host computing device 20 such that the host computing device 20 can access a data storage tape cartridge or a data storage cartridge 12 via the tape drive or the cartridge drive 22, respectively. In one embodiment, the drive bank 16 only includes the cartridge drives 22. In another embodiment, the drive bank 16 includes at least one conventional tape drive and at least one cartridge drive 22, wherein the cartridge drive 22 is a tape drive emulator.

The automation unit 18 facilitates movement of the data storage cartridges 12 between the cartridge storage unit 14 and the drive bank 16. The automation unit 18 includes a library control unit 24 and a robotic arm 26. The library control unit 24 is configured to receive instruction and direction from the host computing device 20 and to generate signals to activate the automation unit 18 in accordance with the instructions received. In particular, the library control unit 24 interprets storage access requests from the host computing device 20, and provides signals to control the motion and operation of the robotic arm 26. The robotic arm 26 typically includes a gripper 28 to facilitate secure handling of the data storage cartridges 12. The host computing device 20 is any computer system configured to relay access signals from a user (not shown) to the automation unit 18 and to read from and to write to the data storage cartridges 12 via the cartridge drive 22 contained within the drive bank 16.

During use, in response to communication signals from the host computing device 20, the library control unit 24 generates control signals directing the robotic arm 26 to retrieve the appropriate data storage cartridge 12 from the cartridge storage unit 14 and to insert the data storage cartridge 12 into one of the cartridge drives 22 in the drive bank 16. In response to the signals from the library control unit 24, the robotic arm 26 traverses the cartridge unit 14 and engages the particular data storage cartridge 12 using the gripper 28. The robotic arm 26 then moves the data storage cartridge 12 to the drive bank 16 to insert the data storage cartridge 12 into one of the cartridge drives 22.

Upon insertion of the data storage cartridge 12 into one of the cartridge drives 22, the host computing device 20 can read data from and write data to the data storage cartridge 12. In one embodiment, the automated library system 10 similarly works to access conventional, data storage tape cartridges via conventional tape drives contained within the drive bank 16. Notably, the data storage cartridge 12 can similarly be used with individual or stand-alone cartridge drives 22 rather than in the library context.

In order to be useful with automated library system 10, or with individual cartridge drives 22, the data storage cartridges 12 conform to standard form factors or dimensions of the conventional data storage tape cartridges, such as a data storage tape cartridge. In addition, the data storage cartridges 12 include similar handling features or notches as standard form factor data storage cartridges. Accordingly, in one embodiment, the conventional data storage tape cartridges and the data storage cartridge 12 are generally mechanically indistinguishable by the automation unit 18.

In this manner, the mechanical interfaces between the automation unit 18 need not be adapted or upgraded to support the substitution of the data storage cartridges 12 for the typical data storage tape cartridges used in the automated library system 10. In particular, the existing robotic arms 26 adapted to grasp and interact with typical data storage tape cartridges will be able to grasp and interact with the data storage cartridges 12 since the two cartridges have similar external dimensions. Therefore, existing automated library systems 10 can replace or supplement traditional tape drives with the cartridge drives 22, more particularly, with a cartridge drive 22 that is a tape drive emulator having the ability to utilize the data storage cartridges 12 and, thereby, will be able to utilize the efficiencies of the non-tape storage medium 52 over traditional linear tape storage. In other words, use of the non-tape storage mediums, such as the hard drives 52, will allow the library systems 10 to support true random access to individual files stored within the hard drives 52 or other non-tape storage mediums, thereby decreasing overall file retrieval time.

Figure 2:
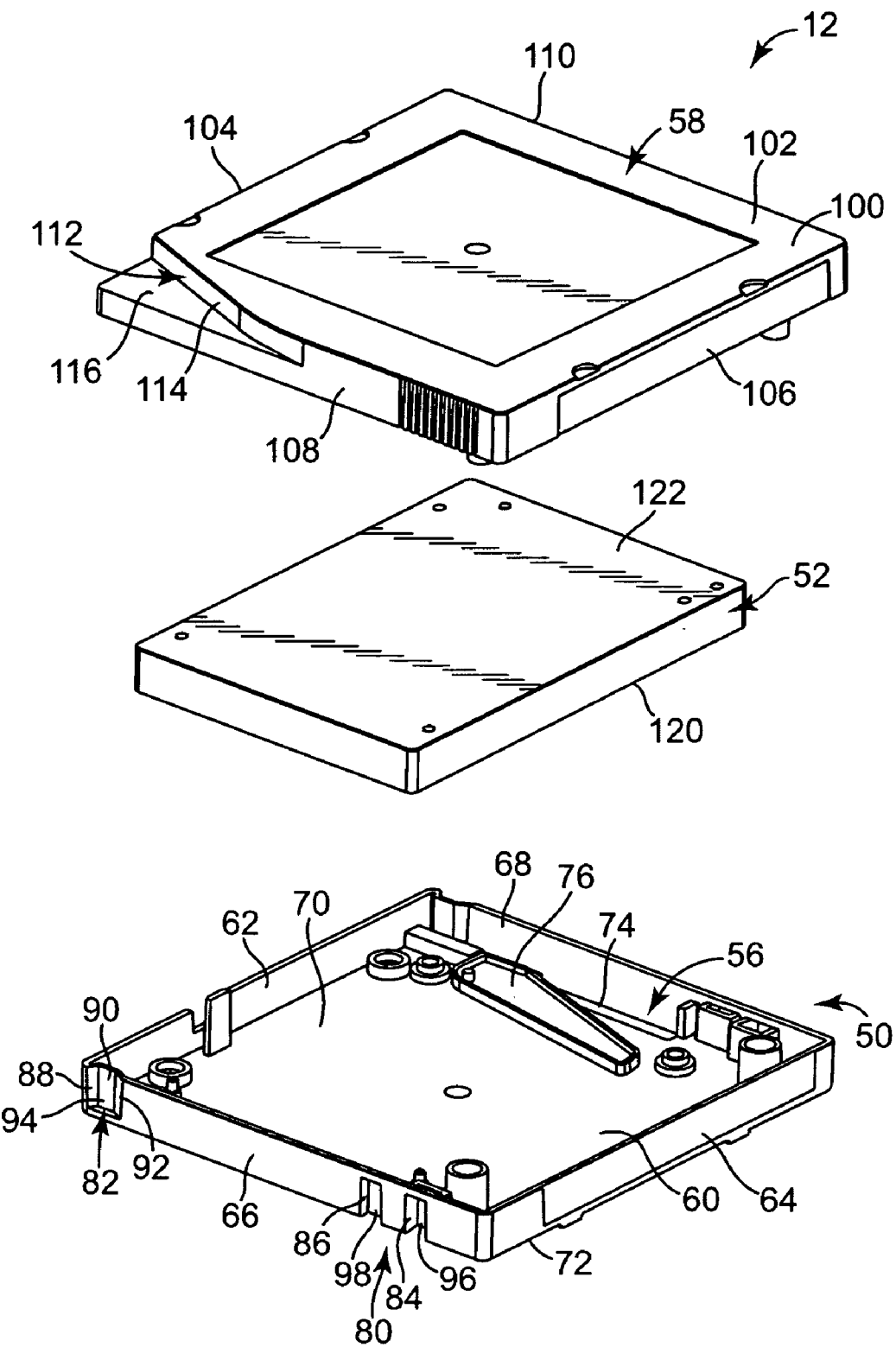
FIG. 2 is an exploded perspective view of one embodiment of a data storage cartridge for use in the automated library system of FIG. 1, according to the present invention.
Figure 3:
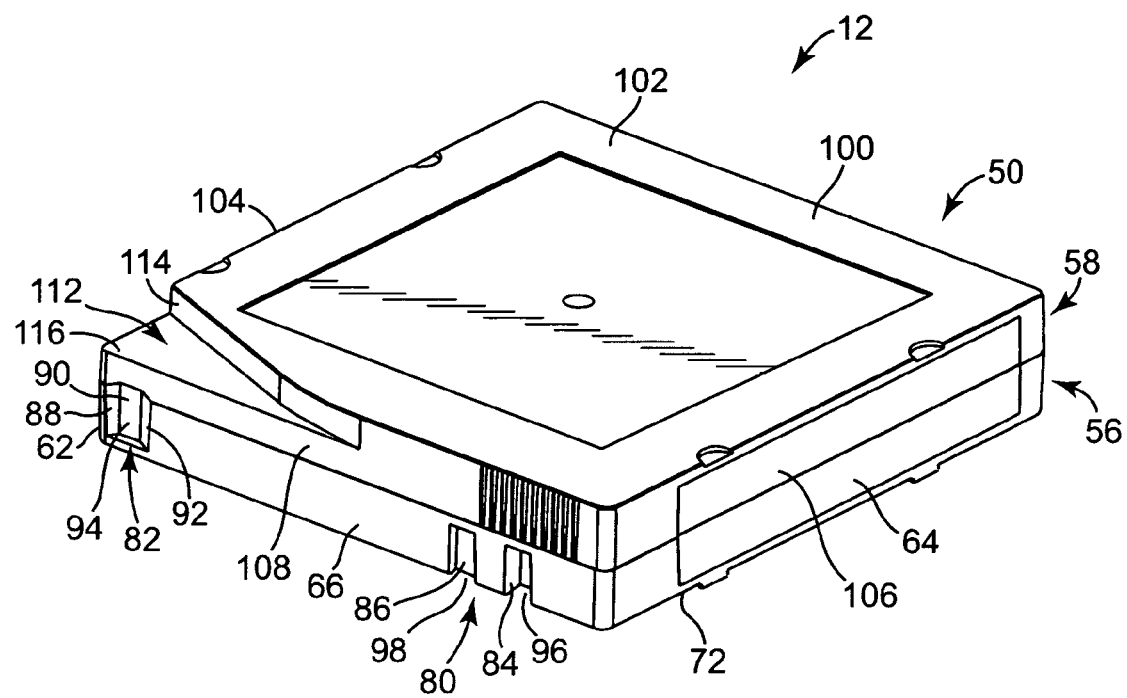
FIG. 3 is a perspective view of the data storage cartridge of FIG. 2.

An exemplary data storage cartridge 12 according to one embodiment of the present invention is generally illustrated in the exploded, perspective view of FIG. 2 and the perspective view of FIG. 3. The data storage cartridge 12 includes a housing 50 and a non-tape storage medium, such as a hard drive 52. The housing 50 includes a first housing section 56 and a second housing section 58 sized to collectively receive and substantially enclose the hard drive 52. In one preferred embodiment, the first housing section 56 serves as a base whereas the second housing section 58 serves as a cover. It should be understood that the directional terminology such as "cover," "base," "first," "second," "top," "bottom," "back," etc., are used for purposes of illustration only and are no way limiting.

The first housing section 56 defines a major portion or member 60, a leading wall 62, a trailing wall 64, a first side wall 66, and a second side wall 68. The major portion 60 is substantially rectangular and substantially planar. As such, the major portion 60 defines an internal surface 70 and an external surface 72 opposite the internal surface 70. The walls 62, 64, 66, and 68 each extend from the internal surface 70 of the major portion 60 in a direction opposite the external surface 72. In particular, the trailing wall 64 extends from the major portion 60 opposite the leading wall 62. The side walls 66 and 68 extend from the major portion 60 between the leading wall 62 and the trailing wall 64 opposite one another.

The major portion 60 defines an access window 74 extending through the surfaces 70 and 72 positioned near the second side wall 68 to provide access to the hard drive 52 from a point external to the data storage cartridge 12. In particular, a device external to the data storage cartridge 12, such as a cartridge drive 22 (FIG. 1), can access the hard drive 52 within the housing 50 via the access window 74 to read from and write to the hard drive 52. In one embodiment, a door 76 is coupled to the major portion 60 of the first housing section 56 to selectively open and close the access window 74, thereby selectively allowing access to the hard drive 52.

In one embodiment, the first side wall 66 defines at least one external handling feature 80. In one embodiment, the at least one external handling feature 80 includes first handling features 82, second handling features 84, and third handling features 86. A first handling feature 82 is defined by the first side wall 66 near the leading wall 62. In one embodiment, the first handling feature 82 defines a first surface 88, a second surface 90, and a third surface 92 each extending from an edge of the first side wall 66 opposite major portion 60. In one embodiment, the surfaces 88, 90, and 92, do not fully extend throughout the major portion 60. The second surface 90 is parallel to and offset from the remainder of the first side wall 66 in an inward direction (i.e., toward the second side wall 68). The first surface 88 and the third surface 92 extend between the remainder of the first side wall 66 and the second surface 90 in an inclined or angled manner opposite one another. With this in mind, a cavity 94 is at least partially defined by the first handling feature 82.

In one embodiment, the first handling feature 82 is positioned on the data storage cartridge 12 in a similar manner as a handling notch is positioned on a data storage tape cartridge. In particular, the first handling feature 82 is positioned on the data storage cartridge 12 within size and position tolerances of the corresponding handling notch of the data storage tape cartridges. The first handling feature 82 is within such tolerances if the automated library system 10 or stand-alone cartridge drive 22 utilizing the data storage cartridge 12 can interact with the first handling feature 82 in a similar manner as it interacts or would interact with a corresponding handling notch of the data storage tape cartridge, as will be further described below. In one embodiment, the first handling feature 82 is positioned along the first side wall 66 in a location within +/−0.005 inch (0.127 mm) from the form factor requirements for size and position of the corresponding handling notch of a standard form factor data storage cartridge.

A second handling feature 84 is formed as a recess or cavity 96 in the first side wall 66 relatively near the trailing wall 64. In one embodiment, the cavity 96 extends inwardly (i.e., toward the second side wall 68) from the remainder of the first side wall 66. The cavity 96 extends through the major portion 60, but not through the edge of the first side wall 66 opposite the major portion 60. As such, the cavity 96 is accessible from the first side wall 66 and from the external surface 72 of the major portion 60. In one embodiment, the cavity 96 has a substantially polygonal cross-section.

In one embodiment, the second handling feature 84 is sized and positioned on the data storage cartridge 12 similar to a size and position of a corresponding handling notch on a data storage tape cartridge. In particular, the second handling feature 84 is positioned on the data storage cartridge 12 within tolerances for size and position of the corresponding handling notch of the data storage tape cartridge. The second handling feature 84 is within such tolerances if the automated library system 10 or stand-alone cartridge drive 22 utilizing the data storage cartridge 12 can interact with the second handling feature 84 in a similar manner as it interacts or would interact with the corresponding handling notch of the data storage tape cartridge, as will be further described below. In one embodiment, the second handling feature 84 is sized and positioned along the first side wall 66 in a location within +/−0.005 inch (0.127 mm) from the form factor requirements for the size and position of the corresponding handling notch on a standard form factor data storage cartridge.

A third handling feature 86 is defined by the first side wall 66 between the first handling feature 82 and the second handling feature 84. In one embodiment, the third handling feature 86 is relatively closer to the second handling feature 84 than the first handling feature 82. In one embodiment, the third handling feature is a cavity 98 extending inwardly (i.e., toward the second side wall 68) from the remainder of the first side wall 66. The cavity 98 extends through the major portion 60, and as such, the cavity 98 is accessible from the first side wall 66 and from the external surface 72 of major portion 60. In one embodiment, the cavity 98 is substantially polygonal, more preferably rectangular in cross-section.

In one embodiment, the third handling feature 86 is sized and positioned on the data storage cartridge 12 in a similar manner as the positioning notch is positioned on a data storage tape cartridge. In particular, the third handling feature 86 is positioned on the data storage cartridge 12 within tolerances for size and position of the corresponding handling notch of the data storage tape cartridge. The third handling feature 86 is within such tolerances if the automated liberty system 10 or stand-alone cartridge drive 22 utilizing the data storage cartridge 12 can interact with the third handling feature 86 in a similar manner as it interacts or would interact with the corresponding handling notch of the data storage tape cartridge, as will be further described below.

In one embodiment, the third handling feature 86 is sized and positioned long the first side wall 66 in a location within +/−0.005 inch (0.127 mm) from the form factor requirements for size and position of the corresponding handling notch of a standard form factor data storage cartridge. In one embodiment, the third handling feature 86 extends inwardly from the remainder of the first side wall 66 a smaller distance than the corresponding handling notch of the data storage tape cartridge due at least in part to constraints caused by the size and position of the hard drive 52 within housing 50. As such, the cavity 98 is more shallow than a cavity defined by a corresponding handling notch of the data storage tape cartridge.

In one embodiment, the second side wall 68 defines at least one handling feature such as a first handling feature 82, a second handling feature 84, and/or a third handling feature 86 in a similar manner as described with respect to the first side wall 66 above. In one embodiment, the first housing section 56 is formed of a polymeric material. In one embodiment, the first housing section 56 is formed by injection molding or a suitable material such as polycarbonate. Alternatively, other materials and/or manufacturing techniques can be employed to form the first housing section 56.

As illustrated in FIG. 2 and FIG. 3, the second housing section 58 of the housing 50 includes a major portion or member 100, which is substantially planar, defining an exterior surface 102 and an interior surface (not shown) opposite the exterior surface 102. The second housing section 58 further defines a leading wall 104, a trailing wall 106, a first side wall 108, and a second side wall 110 each extending from the major portion 100 opposite the exterior surface 102 about a perimeter of the major portion 100. In particular, the trailing wall 106 is positioned opposite the leading wall 104, and the first and second side walls 108 and 110 extend between the leading wall 104 and the trailing wall 106 opposite one another.

In one embodiment, a fourth handling feature 112 is defined by the second housing section 58. In particular, an upper and leading portion 114 of the first side wall 108 extends angularly inward (i.e., toward the second side wall 110) from the remainder of the first side wall 108 to the leading wall 104. As such, the fourth handling feature 112 is formed in part by each of the leading wall 104 and the first side wall 108. In one embodiment, the upper and leading portion 114 is adjacent the substantially planar, major portion 100 and, thereby, alters the otherwise substantially rectangular shape of the major portion 100. A secondary planar surface 116 extends parallel to the major portion 100 between the upper and leading portion 114 and the remainder of the leading wall 104 and the first side wall 108.

In one embodiment, the fourth handling feature 112 is formed, sized, and positioned on the data storage cartridge 12 similar to the position of a misinsertion notch of a standard form factor data storage tape cartridge. In one embodiment, the fourth handling feature 112 is defined by the second housing section 58 with a size and position within +/−0.005 inch (0.127 mm) from the form factor requirements for the size and position of a misinsertion notch of the data storage tape cartridge.

In one embodiment, the second housing section 58 is formed of a polymeric material. In one embodiment, the second housing section 58 is formed by injection molding or a suitable material such as polycarbonate. Alternatively, other materials and/or manufacturing techniques can be employed to form the second housing section 58.

Notably, the second housing section 58 is generally sized similar to the first housing section 56. In addition, the walls 104, 106, 108, and 110 extend from the major portion 100 in a similar, but opposite, manner as the walls 62, 64, 66, and 68 extend from the major portion 60. Accordingly, each of the walls 104, 106, 108, and 110 of the second housing section 58 are configured to mate with the walls 62, 64, 66, and 68 of the first housing section 56, respectively, to couple the first housing section 56 to the second housing section 58.

In one preferred embodiment, the housing 50 has a length (i.e., a dimension along a direction parallel with the leading walls 62 and 104) of approximately 4.15 inches (105.4 mm), a width of approximately 4.01 inches (102 mm), and a height of approximately 0.85 inch (21.5 mm), which is typical for a conventional linear tape open (LTO) data storage tape cartridge. In other embodiments, the external dimensions of the housing 50 conform to one of a number of industry-standard form factors, such as the standard form factors of the Black Watch™ 9840 and the Royal Guard™ 3480, 3490E, 3490EL, and 9490EE magnetic storage tape cartridges manufactured by Imation Corporation of Oakdale, Minn.

Figure 5:
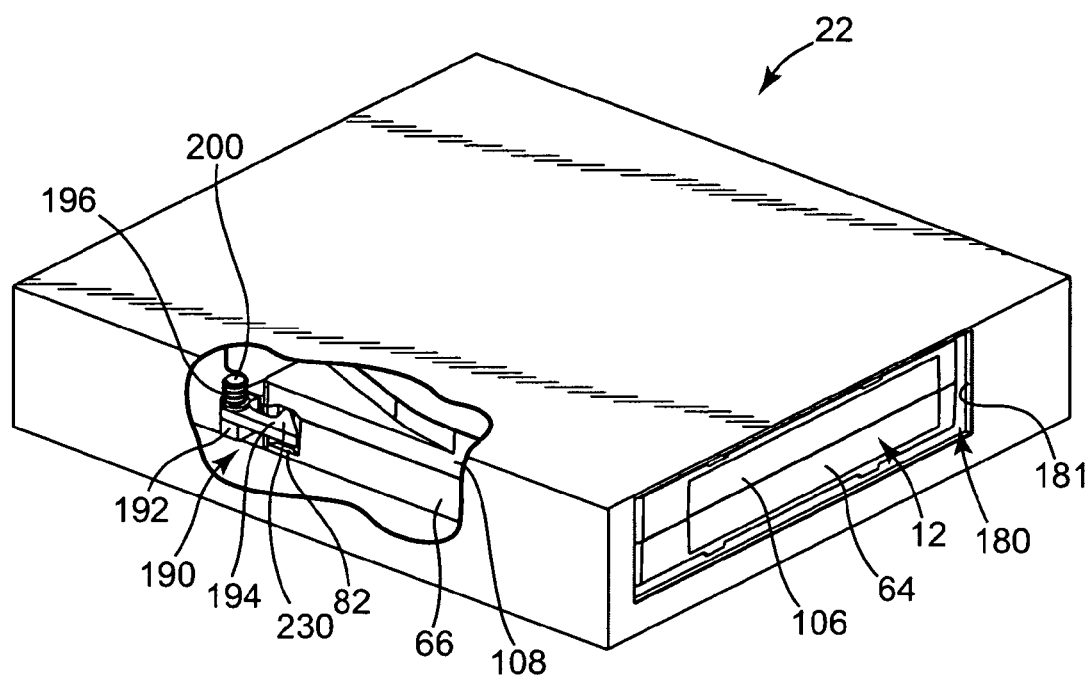
FIG. 5 is a perspective view of the data storage cartridge of FIG. 2 positioned within a cartridge drive of FIG. 1.

As illustrated in FIG. 2, the hard drive 52 is generally rectangular in structure and sized and shaped to fit within the housing 50, more particularly between the first housing section 56 and the second housing section 58. The hard drive 52 further defines a first surface 120 and a second surface 122 opposite the first surface 120. The first surface 120 defines at least one data connection or data access point (not shown). The at least one data connection point is adapted to be accessed by a cartridge drive 22 (FIGS. 1 and 5).

The hard drive 52 or other non-tape storage medium may take the form of a variety of storage media, such as a disc-shaped magnetic storage medium, a solid-state storage medium, an optical storage medium, a magneto-optical storage medium, and a holographic storage medium. The solid-state storage medium may be any non-volatile memory such as an erasable programmable read-only memory (EPROM), an electrically erasable programmable memory (FLASH memory) or the like.

Upon assembly, the hard drive 52 is placed at least partially within the first housing section 56 such that the at least one data connection point (not illustrated) of the hard drive 52 is aligned with the access window 74 of the first housing section 56. As such, the at least one data connection point is accessible from a point external to the data storage cartridge 12 via the access window 74. In one embodiment, the hard drive 52 is attached to the first housing section 56 with screws (not shown). Other or additional methods of attachment between the first housing section 56 and the hard drive 52 will be apparent to those of ordinary skill in the art.

Once the hard drive 52 is secured to the first housing section 56, the second housing section 58 is placed over the hard drive 52 to interact with the first housing section 56. In particular, the leading wall 104, the trailing wall 106, the first side wall 108, and the second side wall 110 of the second housing section 58 interact with the leading wall 62, the trailing wall 64, the first side wall 66, and the second side wall 68 of the first housing section 56, respectively. Other devices or method of securing the second housing section 58 to the first housing section 56 will be apparent to those of ordinary skill in the art. In one embodiment, the second housing section 58 is further coupled with the hard drive 52.

Similar to interaction between the conventional data storage tape cartridges and the storage cells 23 of the cartridge storage unit 14, the data storage cartridge 12 is adapted to interact with the storage cells 23 of the cartridge storage unit 14, one embodiment of which is illustrated in FIG. 4. The storage cell 23 defines a first or bottom wall 130, a second or back wall 132, and a third or top wall 134. The bottom wall 130 and the top wall 134 are spaced from and substantially parallel to one another. The back wall 132 extends between an end of each of the bottom and top walls 130 and 134. As such, a substantially rectangular cavity 136 is defined between the walls 130, 132, and 134 with an opening 138 opposite the back wall 132.

In one embodiment, the storage cell 23 includes at least one positioning feature to facilitate positioning of the data storage cartridge 12 within the cavity 136. In one embodiment, the at least one positioning feature includes a first positioning feature 140, a second positioning feature 142, and/or a third positioning feature 144. The first positioning feature 140 is positioned near the intersection of the bottom wall 130 and the back wall 132. In one embodiment, the first positioning feature 140 is at least partially embedded into the bottom wall 130.

The first positioning feature 140 is generally an elongated, rigid member defining a first end 150 and a second end 152. In one embodiment, the second end 152 includes a foot or protrusion 154 substantially perpendicular to the remainder of the first positioning feature 140. In one embodiment, the first positioning feature 140 is rotatably coupled to the bottom wall 130 or the back wall 132 at the first end 150 about a fulcrum 156 of the storage cell 23. In one embodiment, rotation of the first positioning feature 140 about the fulcrum 156, into and out of the cavity 136, is controlled by an actuation mechanism (not shown) within the cartridge storage unit 14 (FIG. 1).

In one embodiment, the second positioning feature 142 is positioned near the intersection of the top wall 134 and the back wall 132 of the storage cell 23. The second positioning feature 142 is at partially embedded within the top wall 134. The second positioning feature 142 is a generally elongated and substantially rigid member defining a first end 160 and a second end 162. The first end 160 is rotatably coupled to the top wall 134 or the back wall 132 about a fulcrum 164 defined by the storage cell 23. In one embodiment, the second positioning feature 142 additionally includes a biasing member (not shown), such as a leaf spring, a coil spring, or any other elastomeric member, for biasing the second positioning feature 142 towards the cavity 136. In one embodiment, the second positioning feature 142 additionally includes a roller bearing 166 rotatably attached to the second end 162 of the second positioning feature 142. More particularly, the roller bearing 166 is coupled with the second end 162 of the second positioning feature 142 to rotate about an axis substantially perpendicular to the extension of the second positioning feature 142 between the first end 160 and the second end 162. In one embodiment, rather than a roller bearing 166, the second positioning feature 142 include a low-friction material on the second end 162, such as a non-rotating plastic or metal cylinder.

The third positioning feature 144 is positioned and at least partially embedded within the bottom wall 130 near the opening 138 of the cavity 136. In one embodiment, the third positioning feature 144 is rigid and substantially elongated to define a first end 170 and a second end 172. The first end 170 of the third positioning feature 144 is rotatably coupled to a fulcrum 174 defined by the bottom wall 130. In one embodiment, rotation of the third positioning feature 144 about the fulcrum 174, into and out of the cavity 136, is induced by an actuation mechanism (not shown) included within the storage cell 23.

Notably, in one embodiment, the first positioning feature 140 is formed in a similar manner as described above with respect to the second positioning feature 142. In another embodiment, the second positioning feature 142 is formed in a similar manner as described above with respect to the first positioning feature 140. In one embodiment, the third positioning feature 144 is also formed in a similar manner as described above with respect to the first or second positioning features 140 or 142. In other embodiments, only one or two of the positioning features 140, 142, or 144 is incorporated into the storage cell 23. Other similar positioning features will be apparent to those of ordinary skill in the art.

In one embodiment, the storage cell 23 is configured to receive a data storage cartridge 12 or a data storage tape cartridge. In one embodiment, a plurality of substantially identical storage cells 23 are provided within the cartridge storage unit 14 (FIG. 1) wherein each of a first portion of the plurality of storage cells 23 selectively maintains a data storage cartridge 12 and each of a second portion of the plurality of storage cells 23 selectively maintains a data storage tape cartridge.

Collectively referring to FIGS. 3 and 4, during use, the robotic arm 26 (FIG. 1) inserts the data storage cartridge 12 into the storage cell 23 in the direction indicated by arrow 176. As such, the data storage cartridge 12 is inserted through the opening 138 and into the cavity 136. In one embodiment, the data storage cartridge 12 is inserted into the cavity 136 in an orientation as illustrated in FIG. 4 (i.e., with the trailing edges 64 and 106 first). In other embodiments, the data storage cartridge 12 is inserted into the cavity 136 in other orientations, such as with the leading edges 62 and 104 first. With this in mind, the data storage cartridge is maintained between the walls 130, 132, and 134.

Upon insertion of the data storage cartridge 12 into the cavity 136, the first positioning feature 140 is rotated about the fulcrum 156, thereby, moving the second end 152 toward the data storage cartridge 12. In particular, in one embodiment, the first positioning feature 140 is rotated such that the foot 154 fits within and interacts with the second handling feature 84 of the first side wall 66. As such, the first positioning feature 140 functions to maintain the position of the data storage cartridge 12 within the cavity 136. In one embodiment, the first positioning feature 140 is positioned with respect to the cavity 136, such that, the first positioning feature 140 facilitates maintenance of the data storage cartridge 12 spaced from the bottom wall 130.

The second positioning feature 142, more particularly, the roller bearing 166 of the second positioning feature 142 is configured to roll along the second side wall 68 of the data storage cartridge 12 as the data storage cartridge is slid into the cavity 136. The roller bearing 166 continues to roll until the roller bearing 166 at least partially fits or is positioned within the cavity 96 of the second handling feature 84 positioned on the second side wall 68. Notably, in one embodiment, the biasing of the second positioning feature 142 towards the cavity 136 decreases or alleviates the need for selective automation or actuation of the second positioning feature 142 by any mechanism within the storage cell 23. Furthermore, the biasing of the second positioning feature 142 towards the cavity 136, and therefore towards the data storage cartridge 12, facilitates maintaining the data storage cartridge 12 spaced from the top wall 134.

Although the first positioning feature 140 and the second positioning feature 142 are each illustrated and described as interacting with the second handling features 84 in the respective side walls 66 and 68, in one embodiment, the first positioning feature 140 and/or the second positioning feature 142 are configured to interact with the third handling feature 86 of the respective side wall 66 or 68.

Following insertion of the data storage cartridge 12 into the cavity 136, the third positioning feature 144 is actuated to rotate about the fulcrum 174, thereby, rotating the second end 172 of the third positioning feature into the cavity to interact with the fourth handling feature 112 of the data storage cartridge 12. More particularly, the third positioning feature 144 interacts with the upper and leading portion 114 of the data storage cartridge 12. As such, the third positioning feature 144 facilitates maintenance of the data storage cartridge 12 within the storage cell 23 of the cartridge storage unit 14. In addition, in one embodiment, the third positioning feature 144 maintains the data storage cartridge 12 spaced from the bottom wall 130 of the storage cell 23.

In one embodiment, the spacing of the data storage cartridge 12 from the bottom wall 130 and/or the top wall 134 aids the overall functioning of the automated library system 10. In particular, in one embodiment, the gripper 28 of the robotic arm 26 (FIG. 1) selectively extends into the space between the data storage cartridge 12 and the bottom wall 130 and the top wall 134 to grasp the data storage cartridge 12 to manipulate the data storage cartridge 12. As such, the spacing of the data storage cartridge 12 with respect to the bottom wall 130 and the top wall 134 allows the gripper 28 to be selectively placed between the data storage cartridge 12 and the bottom wall 130 and/or the top wall 134 to grasp the data storage cartridge 12. In one embodiment, additional positioning features may be incorporated into the storage cell 23. For example, an additional positioning feature may be incorporated in the storage cell 23 that interacts with one or both of the first handling features 82 formed in the side wall 66 and 68 of the data storage cartridge 12.

It should be noted that since the data storage cartridge 12 has external dimensions and handling features 80 similar to the external dimensions and handling features of the data storage tape cartridge, interaction between the storage cell 23 and/or automation arm 26 and the data storage cartridge 12 is similar to the interaction between the storage cell 23 and/or automation arm 26 and the data storage tape cartridge.

During use, the data storage cartridge 12 is also adapted to interact with the cartridge drive 22 as illustrated in FIG. 5. The cartridge drive 22 is adapted to access the hard drive 52 (FIG. 2) within the housing 50 in order to read data from or write data to the hard drive 52. In one embodiment, in which the cartridge drive 22 is a tape drive emulator, the cartridge drive 22 is further adapted to convert the data received from the hard drive 52 into a format emulating or imitating the typical data format retrieved from conventional, data storage tape cartridges as fully described in U.S. patent application Ser. No. 10/294,514 filed Nov. 14, 2002 entitled "Method and System for Emulating Tape Storage Format Using a Non-Tape Storage Medium," which is hereby incorporated herein by reference. In this manner, the cartridge drive 22 that is a tape drive emulator appears to other computing devices as a conventional data storage tape cartridge. Therefore, the drivers or software executing on the other computing devices need not be altered to interact with the cartridge drive 22 rather than with a conventional tape drive with which the drivers and software were originally designed to interact. As such, replacement of a conventional tape drive with the cartridge drive 22 allows an existing system or library to utilize data storage cartridges 12 including a hard drive 52 rather than the conventional, data storage tape cartridges.

One embodiment of the cartridge drive 22 includes a cavity or socket 180 adapted to selectively receive the data storage cartridge 12. An interface connector (not shown) is located within the socket 180 and configured to access the data connection points (not shown) of the hard drive 52 via the access window 74 (FIG. 2) of the cartridge housing 50. In one embodiment, an actuation mechanism or pin is also located in the socket to open the door 76 (FIG. 2) upon insertion to allow the interface connector to access the hard drive 52.

In order to facilitate this alignment, in one embodiment, at least one retainer assembly 190 is included in the socket 180 as illustrated in FIG. 5. The retainer assembly 190 is configured to selectively retain the data storage cartridge 12 within the socket 180 in a position to allow interaction between the interface connector and the data connection points of the hard drive 52. In a preferred embodiment, two retainer assemblies 190 are included in the socket 180 spaced opposite one another and each positioned opposite an opening 181 of the socket 180. In one embodiment, the retainer assembly 190 includes a bracket 192, a retaining body 194, and a spring 196.

Figure 6:
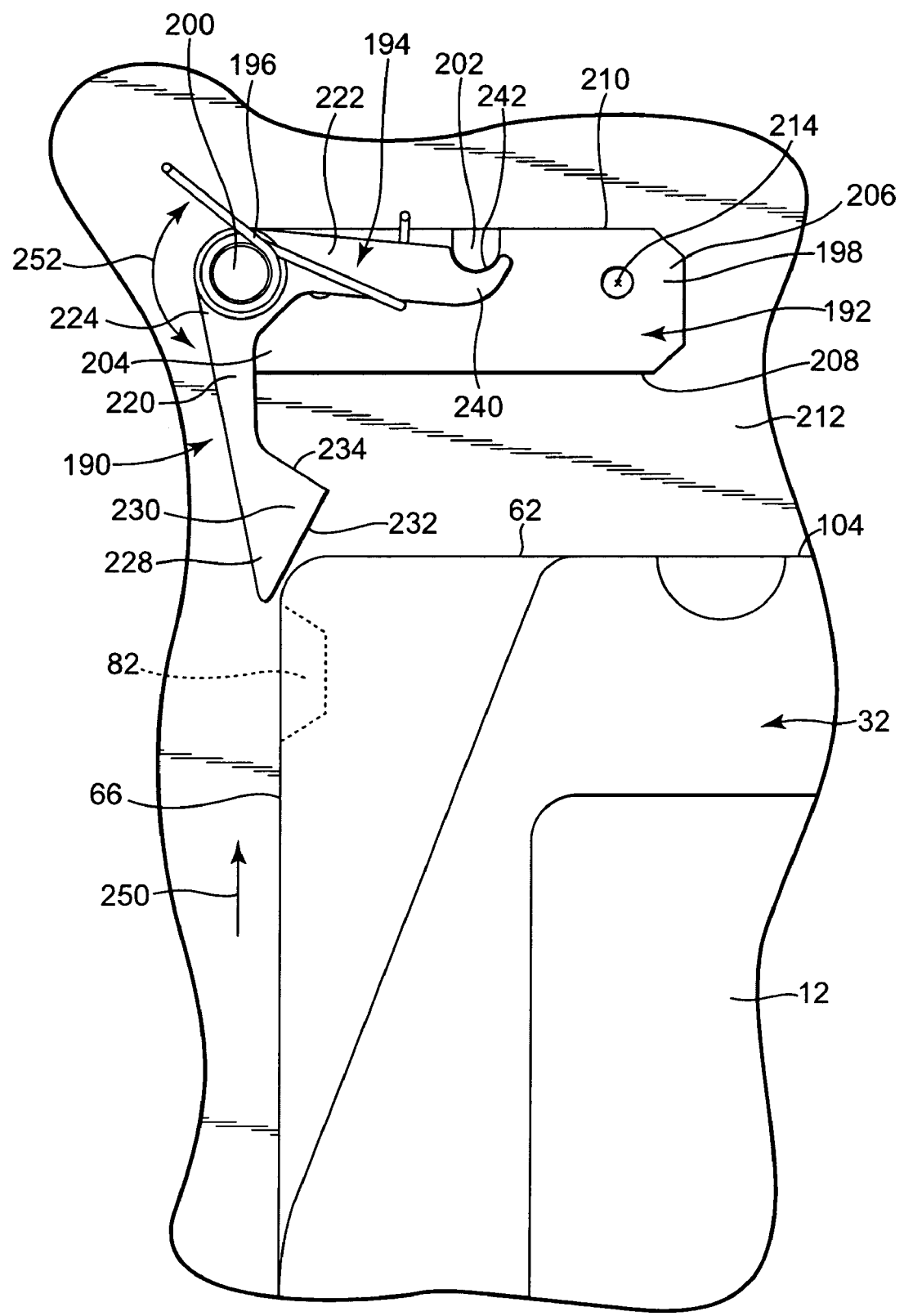
FIG. 6 is a detailed top view of a retainer assembly and a portion of the data storage cartridge of FIG. 2 within the cartridge drive of FIG. 5.

Additionally referring to the detailed view of FIG. 6, which illustrates the retainer assembly 190 and the data storage cartridge 12 inside the socket 180, the bracket 192 defines a base portion 198, a shaft 200, and a stop 202. The base portion 198 is elongated, more preferably substantially rectangular in shape. The base portion 198 defines a first end 204, a second end 206 opposite the first end 204, a first longitudinal side 208, and a second longitudinal side 210 opposite the first longitudinal side 208. The bracket 192, more specifically, the base portion 198, is coupled to a cartridge drive surface 212 within the socket 180 such that the first longitudinal side 208 is relatively closer to the opening 181 of the socket 180 than is the second longitudinal side 210. In one embodiment, the bracket 192 is coupled to the cartridge drive surface 212 with at least one screw 214 or other means of attachment as will be apparent to those of ordinary skill in the art.

The shaft 200 is substantially cylindrical and extends from the base portion 198 near the first end 204. More specifically, in one embodiment, the shaft 200 extends from the base portion 198 in a substantially perpendicular fashion. In one embodiment, the stop 202 is a substantially cylindrical or polygonal rod extending from the base portion 198 in the same general direction as the shaft 200. The stop 202 is spaced from the shaft 200, and therefore, is relatively near the second end 206 of the base portion 198. Additionally, the stop 202 is positioned relatively near the second longitudinal side 210 of the base portion 198.

In one embodiment, the retaining body 194 is substantially L-shaped and, accordingly, defines a first or cartridge interface arm 220 and a second or stop interface arm 222 each extending from an intersection portion 224. In one embodiment, the first arm 220 and the second arm 222 extend from the intersection portion 224 to define an angle between the arms 220 and 222 of approximately 45° and 180°, more preferably between 60° and 120°. A circular aperture (not shown) is defined in the intersection portion 224 and is sized to receive the shaft 200 of the bracket 192. The first arm 220 extends from the intersection portion 224 to a cartridge interface end 228.

The cartridge interface end 228 includes a triangular tab 230 defining a lead-in surface 232 and a retainer surface 234. The lead-in surface 232 is positioned opposite the intersection portion 224 and angles back towards the second arm 222. The retainer surface 234 extends from the lead-in surface 232 back towards the remainder of the first arm 220 and the intersection portion 224.

The second arm 222 extends from the intersection portion 224 to a stop interface end 240. The stop interface end 240 is configured to interact with the stop 202 of the bracket 192. In one embodiment, the stop interface end 240 includes a recess or cut-out 242 shaped similar to the stop 202 and configured to selectively and at least partially receive the stop 202.

In one embodiment, the retaining body 194 is coupled with the bracket 192 with the spring 196. More specifically, in one embodiment, the aperture (not shown) of the bracket 192 rotatably receives the shaft 200 such that the shaft 200 extends through and beyond the aperture. Accordingly, the retaining body 194 is rotatable about the shaft 200. In one embodiment, the spring 196 is a coil spring and is axially placed around the portion of the shaft 200 extending through and beyond the aperture. With this in mind, the spring is coupled with the retaining body 194 to bias the retaining body 194 toward the stop 202 of the bracket 192. Accordingly, the stop 202 interacts with stop interface end 240, more particularly, the recess 242, to prevent the retaining body 194 from rotating past the stop 202. In alternative embodiments, devices or assemblies other than spring 196 are utilized to bias the retaining body 194 toward the stop 202. For example, in one embodiment, a leaf spring coupled with the bracket 192 or other structure within the socket 180 biases the retaining body 194 toward the stop 202.

In particular, during use, the data storage cartridge 12 is positioned with the leading walls 62 and 104 (FIGS. 2 and 3) facing the socket opening 181 of the cartridge drive 22, and the data storage cartridge 12 is slid through the opening 181 and into the socket 180. As the data storage cartridge 12 is slid into the socket 180, the door 76 (FIG. 2) is gradually opened. When in the open position, the door 76 leaves the access window 74 (FIG. 2) uncovered and substantially unobstructed. With the above in mind, the location of the data storage cartridge 12 within the socket 180 of the cartridge drive 22 is important in order to ensure alignment of the interface connector, the access window 74, and the data connection points on the hard drive 52 within the cartridge housing 50.

The alignment of the data storage cartridge 12 within the socket 180 is facilitated by the at least one retainer assembly 190. In one embodiment, upon insertion of the data storage cartridge within the socket in the direction indicated by the arrow 250, the retainer assembly 190 interacts with the leading wall 62 and the first handling feature 82 of the first side wall 66. For example, during movement of the data storage cartridge in the direction indicated by the arrow 250, the leading wall 62 and/or the second side wall 68 interact with the lead-in surface 232 of the retaining body 194, thereby, inducing rotation of the retaining body 194 about shaft 200 in the clockwise direction indicated by the arrow 252.

As the data storage cartridge 12 continues to slide in the socket 180, the triangular tab 230 travels along the first side wall 66. Eventually, the tab 230 is slid into the first handling feature 82. In particular, due to the spring bias of the retaining body 194 in the counterclockwise direction indicated by the arrow 252 (i.e., toward the data storage cartridge 12), the tab 230 follows the first surface 88 to the second surface 90 of the first handling feature 82. Additional bias and rotation of the retaining body 194 causes the retainer surface 234 of the retaining body 194 to interact with the first surface 88 of the handling feature 82, thereby, fixing the data storage cartridge 12 into the socket 180. Once movement of the data storage cartridge 12 is stopped, the data storage cartridge 12 is properly aligned within the socket 180 such that the cartridge data connector (not shown) can access the hard drive 52, namely the data connection points (not shown), through the access window 74 in the cartridge housing 50.

Following the cartridge drive 22 reading from or writing to the hard drive 52, the data storage cartridge 12 is slid out of the socket 180, causing the retaining body 194 to rotate in the clockwise direction as the tab 230 interacts with the side wall 66. Once the data storage cartridge 12 is slid out of contact with or reach of the retaining body 194, the retaining body 194 rotates counterclockwise due to the bias of the spring 196 until the stop interface end 240 contacts the stop 202. As such, the retaining body 194 is maintained in the proper position to interact with a data storage cartridge 12 subsequently inserted into the socket 180 of the cartridge drive 22.

Although described with respect to a single retainer assembly 190, in one embodiment, the cartridge drive 22 includes two retainer assemblies 190. The second retainer assembly 190 is positioned opposite the first retainer assembly 190, described above, and configured to interact with the first handling feature 82 of the second side wall 68 in a similar manner as the first retainer assembly 190 is illustrated and described as interacting with the first handling feature of the first side wall 66.

It should be noted that because the data storage cartridges according to the present invention conform to standard form factors or dimensions of the conventional data storage tape cartridges, the conventional data storage tape cartridge and the data storage cartridges of the present invention are mechanically indistinguishable by the cartridge storage unit and the automation unit. In this matter, the mechanical interfaces between the cartridge storage unit, in particular, each storage cell, and the automation unit need not be adapted or upgraded to support the substitution of the data storage cartridges for the typical data storage tape cartridges.

In particular, existing robotic arms adapted to grasp and interact with typical data storage tape cartridges will be able to grasp and interact with the data storage cartridge according to the present invention since the two cartridges have similar external dimensions. In addition, since the handling features of the data storage cartridge are similar to the handling, positioning, and misinsertion notches of the conventional data storage tape cartridges, the positioning features of the storage cells will also be able to interact with the data storage cartridge in a similar manner as they interact with the typical data storage tape cartridge.

Therefore, traditional and existing cartridge libraries that replace the traditional tape drives with the cartridge drive including tape drive emulators will be able to utilize the data storage cartridges and, in particular, will be able to utilize the efficiencies of hard drive storage over traditional linear tape storage. In other words, use of hard drives will allow the libraries to support true random access to individual files stored within the hard drives, thereby decreasing file retrieval time. Further, since the hard drive is precisely aligned with the first housing section, the cartridge drives can precisely and repetitively interact with the at least one electrical connection point of the hard drive through the access window of the first housing section. This precise interaction provides for a more reliable reading of or writing to the data storage tape cartridge.

Although specific embodiments have been illustrated and described herein it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate the present invention may be implemented in a very wide variety of embodiments. For example, although the data storage cartridge is illustrated and described as having similar handling features as an LTO cartridge, the data storage cartridge may have similar handling features as any conventional, standardized data storage tape cartridge, such as a DLT cartridge. This application is intended to cover any adaptations or variations of the embodiments discussed herein. Therefore it is manifestly intended that this invention be limited only by the claims and the equivalents thereof.

What is claimed is:

1. A cartridge drive for use with a data storage cartridge including a housing defining at least one external handling feature and a non-tape storage medium maintained within the housing, the cartridge drive comprising:
   a socket for receiving the data storage cartridge; and
   a retainer assembly configured to selectively retain the data storage cartridge within the socket via interaction with the at least one external handling feature;
   wherein the cartridge drive is configured to perform at least one of reading data from and writing data to the non-tape storage medium when the data storage cartridge is retained within the socket; and
   further wherein the retainer assembly includes a spring biased retaining body rotatably mounted within the socket, the retaining body including a cartridge interface arm configured to interact with one of the at least one external handling feature of the housing to align and position the data storage cartridge within the cartridge drive, and wherein rotation of the retaining body is configured to pull the data storage cartridge into the socket.

2. The cartridge drive of claim 1, wherein the cartridge drive is a tape drive emulator.

3. The cartridge drive of claim 1, wherein the cartridge interface arm is biased toward the data storage cartridge.

4. The cartridge drive of claim 1, wherein the retainer assembly is a first retainer assembly, the at least one external handling feature includes a first external handing feature, and the first retainer assembly is configured to interact with the first external handling feature, wherein the cartridge drive further comprises:
   a second retainer assembly configured to interact with a second external handling feature defined by the housing of the data storage cartridge opposite the first external handling feature to facilitate alignment of the data storage cartridge within the socket to allow the cartridge drive to perform at least one of reading data from and writing data to the non-tape storage medium.

5. The cartridge drive of claim 1, wherein the housing of the cartridge defines an access window extending substantially perpendicular to the leading wall, and wherein the cartridge drive is configured to access the non-tape storage medium of the data storage cartridge through the access window of the housing.

6. A data storage cartridge for use with a cartridge drive, the data storage cartridge comprising:
   a non-tape storage medium;
   a housing maintaining the non-tape storage medium, the housing defining:
   a leading wall,
   a trailing wail opposite the leading wall, wherein during use, the leading wall is configured to enter the cartridge drive before the trailing wall enters the cartridge drive,
   a first side wall extending between the leading wall and the trailing wail and defining a first handling notch,
   a second side wail opposite the first side wall and extending between the leading wall and the trailing wall, the second side wall defining a second handling notch,
   an access window extending parallel to the first side wall, wherein the data storage cartridge is configured such that the non-tape storage medium is accessible by the cartridge drive through the access window,
   wherein a third handling notch is further defined on the first side wall and is positioned near the trailing wall, the first and third handling notches being positioned at opposite sides of the access window; and
   a door assembled to an interior of the housing and positioned to selectively cover the access window.

7. The data storage cartridge of claim 6, wherein at least one of the first handling notch and the second handling notch defines a cavity having a trapezoidal cross-sectional shape.

8. The data storage cartridge of claim 6, wherein the housing includes a handling feature partially defined by each of the first side wall and the leading wall.

9. A data storage cartridge for use with a cartridge drive, the data storage cartridge comprising:
   a non-tape storage medium; and
   a housing maintaining the non-tape storage medium, the housing including a base and a cover, the base defining:
   a major member,
   a leading wall,
   a trailing wall opposite the leading wall, wherein during use, the leading wall is configured to enter the cartridge drive before the trailing wall enters the cartridge drive,
   a first side wail extending between the leading wall and the trailing wall and between the major member of be base and a major member of the cover and defining a first handling notch,
   the first handling notch defining a cavity having a trapezoidal cross-sectional shape, with the cavity being defined by a first edge substantially parallel to and spaced from the major member of the base and a second edge substantially parallel to and spaced from the major member of the cover, and the cavity being further defined by a third edge substantially perpendicular to the major members and spaced from the leading wall and a fourth edge substantially perpendicular to the major members and spaced from the trailing wall, and
   a second side wall opposite the first side wall and extending between the leading wall and the trailing wail, the second side wall defining a second handling notch near the leading wall.

10. The data storage cartridge of claim 9, wherein the second handling notch defines a cavity having a trapezoidal cross-sectional shape.

11. A method of a cartridge drive receiving a non-tape data storage cartridge, the method comprising:
   receiving a data storage cartridge within a socket of the cartridge drive, wherein the data storage cartridge includes:
   a cartridge housing defining a first handling feature and a second handling feature positioned near and on opposite sides of a leading wall of the cartridge housing;
   a non-tape storage medium maintained in the cartridge housing;
   transitioning a first retainer assembly and a second retainer assembly of the cartridge drive to each engage a respective one of the first handling feature and the second handling feature of the data storage cartridge, wherein each of the first retainer assembly and the second retainer assembly includes a retaining body rotatably mounted within the socket of the cartridge drive, the retaining body being configured to interact with the external handling feature of the housing to align and position the data storage cartridge within the cartridge drive; and additionally transitioning each of the first and second retainer assemblies to pull the data storage cartridge into the socket by rotation of the retaining bodies.

12. The method of claim 11, further comprising:
performing at least one of reading from and writing to the non-tape storage medium within the data storage cartridge.

13. The method of claim 11, further comprising:
reading data from the non-tape data storage cartridge; and
converting the data into a format emulating a format of data read from a data storage tape cartridge.

14. The method of claim 11, further comprising:
interacting with a third handling feature of the data storage cartridge to grasp the data storage cartridge; and
moving the grasped data storage cartridge between the cartridge drive and a storage cell.

15. The method of claim 11, wherein:
rotation of the retaining bodies moves the cartridge from a location where the cartridge is partially inserted to a location where the cartridge is completely inserted.

* * * * *

UNITED STATES PATENT AND TRADEMARK OFFICE
CERTIFICATE OF CORRECTION

PATENT NO.         : 7,359,145 B2
APPLICATION NO. : 10/881666
DATED                : April 15, 2008
INVENTOR(S)       : Peter A. Ridl Page 1 of 1

It is certified that error appears in the above-identified patent and that said Letters Patent is hereby corrected as shown below:

Column 15 claim 6
　　Line 54, "wail" should read --wall--.
　　Line 59, "wail" should read --wall--.
　　Line 60, "wail" should read --wall--.

Column 16 claim 9
　　Line 24, "wail" should read --wall--.
　　Line 25, "be" should read --the--.
　　Line 39, "wail" should read --wall--.

Signed and Sealed this

Twenty-sixth Day of May, 2009

JOHN DOLL
*Acting Director of the United States Patent and Trademark Office*